INVENTORS.
ERNEST V. BUNTING &
BY  HANS V. LIND

Tweedale & Gerhardt
ATTORNEYS.

INVENTORS.
ERNEST V. BUNTING &
BY HANS V. LIND

Tweedale & Gerhardt
ATTORNEYS.

INVENTORS.
ERNEST V. BUNTING &
BY   HANS V. LIND

Tweedale & Gerhardt
ATTORNEYS.

3,422,906
MIXED DRAFT AND POSITION CONTROL
Ernest V. Bunting, Detroit, and Hans V. Lind, Royal Oak, Mich., assignors to Massey-Ferguson Inc., Detroit, Mich.
Filed Aug. 23, 1965, Ser. No. 481,750
U.S. Cl. 172—9          10 Claims
Int. Cl. A01b 63/112

ABSTRACT OF THE DISCLOSURE

A tractor implement linkage control having hydraulically operated draft links controlled by a draft force responsive member, a draft link position sensing cam member responsive to modify the effect of changes in draft force controlling the draft links with changes in the vertical position of the links and means to move the cam to an inoperative condition to render the same ineffective to modify the effect of changes in draft force controlling the draft links.

---

This invention relates generally to agricultural tractors and is particularly concerned with the automatic control of the working position of an implement with respect to the tractor to which it is attached.

Tractors having a Ferguson type three-point hitch include those having draft control systems in which the draft or working force developed by the implement drawn by the tractor is maintained constant by increasing and decreasing the working depth of the implement as the draft force decreases or increases, respectively, from a selected value determined by the setting of a manual control lever. The tractor hitch is raised and lowered with respect to the tractor by hydraulic rams or actuators which are usually under control of a valve having supply, neutral and discharge positions. When the valve is in its supply position, the actuators are extended to raise the hitch, and when the valve is in its discharge position, the actuators contract to lower the hitch with respect to the tractor. The top link of the tractor hitch reacts in tension or compression against the draft forces and causes a spring engaged thereby to change deflection upon variations in the draft force. The change in deflection is in turn transmitted through a linkage to operate the control valve.

With the above type of draft control system, the operator selects the draft or working force to be maintained by positioning a manual control lever which adjusts the draft control linkage between the spring and valve such that a particular spring deflection is required to hold the valve in its neutral position. When the draft force increases above the selected value, the spring deflection changes and actuates the valve through the draft control linkage from its neutral to supply position causing the hydraulic rams to extend and raise the hitch and decrease the working depth of the implement until the draft force is reduced sufficiently to return the valve to its neutral position. Conversely, when the draft force decreases from the selected valve, the valve is actuated from its neutral to discharge position causing the rams to contract and lower the hitch to increase the working depth until the force returns to the neutral setting.

When the implement drawn by the tractor is of the fully mounted type wherein the entire weight of the implement is supported by the tractor hitch, the earth working tools carried by the implement over its length are raised and lowered simultaneously the same distance when the hitch is raised or lowered with respect to the tractor. The fully mounted implement is generally connected with the tractor hitch through a mast or frame such that the implement has a fixed angular relationship with the draft links of the hitch in all positions of the hitch with respect to the tractor.

However, most tractors are capable of pulling implements which are too heavy to be fully supported on the tractor hitch. Such implements are known as semimounted implements and usually include a tail wheel or other ground support means which supports a portion of the implement weight. Usually, the forward end of the implement is supported on the tractor hitch and the rear end is supported on the tail wheel or other ground support. Consequently, when the tractor hitch is raised or lowered with respect to the tractor, the front end of the implement pivots about the tail wheel and the earth working tools at the front of the implement are initially at a different height with respect to the ground than those at the rear of the implement. There is thus a delay between the time the forward tools reach the depth called for by the draft control system and the time that the rear tools reach the same depth. If a "lower" signal is transmitted by the valve to the hydraulic rams, the working depth of the front tools will be increased faster than that of the rear tools. However, since the depth of the rear tools is initally less than that of the forward tools, the draft force developed by all of the tools will be less than that called for by the control system even after the forward tools have reached their proper depth, and the draft control system will continue to call for lowering the implement. Continued lowering of the tractor hitch will cause the forward tools to dive to an excessive depth and frequently will cause the tractor to stall. It thus becomes necessary to reduce the draft signal in accordance with the vertical position of the forward portion of the implement in order to compensate for the delayed response between the forward and rear tools of the implement.

Since most tractors are used with both fully mounted and semi-mounted implements, the controls must be capable of being quickly and easily converted from a pure draft control system to a mixed position and draft control system and vice versa.

It is therefore an object of this invention to provide a position compensating mechanism that can be quickly and easily installed and removed from a tractor having a draft control system to convert the draft control system to a mixed position and draft control system.

Another object is to provide a position compensating mechanism that can be mounted externally on the body of a tractor having a draft control system, and which will respond to vertical movement of the tractor hitch to transmit a position compensating signal that proportionally alters draft signal as the draft links move vertically with respect to the tractor.

Still another object of this invention is to provide a position compensating mechanism that can be mounted externally on the tractor body for transmitting a position compensating signal to the draft control system in accordance with the vertical movement of the hitch with respect to the tractor, and which can be selectively removed between active and inactive positions.

A further object is to provide a position compensating mechanism that can be installed externally on a tractor having a draft control system without modification of the existing linkage and interconnected with the tractor hitch and draft load sensing mechanism for transmitting a position compensating signal to the hydraulic controls in response to vertical movement to the hitch relative to the tractor caused by a draft signal and which will cause the draft load sensing element to move in a draft link lowering direction in response to upward movement of the draft links and in a draft link raising direction in response to downward movement of the draft links, the position compensating signals increasing as the draft links move from a preselected neutral position.

In accordance with the present invention, a position compensating cam mechanism is installed on a tractor having a conventional draft control system with a control link mounted on the tractor for pivotal movement and for limited longitudinal movement in opposite directions upon variations in draft load, and a draft control linkage having a sensing element which follows the longitudinal movement of the control link to transmit draft change signals to the hydraulic controls. The position compensating cam rotates in response to vertical movement of the tractor hitch to move the sensing element in a hitch raising and lowering position in response to downward and upward movement, respectively, of the hitch to cancel a portion of the draft signal and prevent the front end of a semi-mounted implement from diving too deep during the interval required for the rear of the implement to run in sufficiently to develop its share of the selected draft.

In one embodiment of the invention, a cam is mounted on the shaft of a clevis to which the control link is connected and is rotated by pivotal movement of the control link. The draft load sensing element engages the compensating cam and is actuated by rotation of the cam in a direction opposite to the direction of its initial actuation caused by draft load change. The cam is formed with a constant radius portion which, when the cam is selectively rotated approximately ninety degrees on the clevis shaft, is engaged by the sensing element and has no effect on the sensing element when the hitch is raised or lowered. Thus, the cam is rotated to its active position when a semi-mounted implement is attached to the tractor, and is selectively rotated to its inactive position for use with fully mounted implements.

In a second embodiment of the invention, the position compensating cam is rotatably mounted on a shaft secured directly to the draft control springs and is spring-loaded to an inactive position in which the system operates in pure draft control for use with fully mounted implements. A lever projects radially from the cam shaft and can be rotated against the bias of the spring to position the cam in its active position, and the free end of the lever is secured by a flexible connection with the control link to cause the cam to follow the pivotal movement of the control link and move the draft load sensing element in accordance with the vertical movement of the hitch.

Other objects, advantages and features of the invention will become apparent from the following description taken in connection with the accompanying drawings in which.

Figure 1:
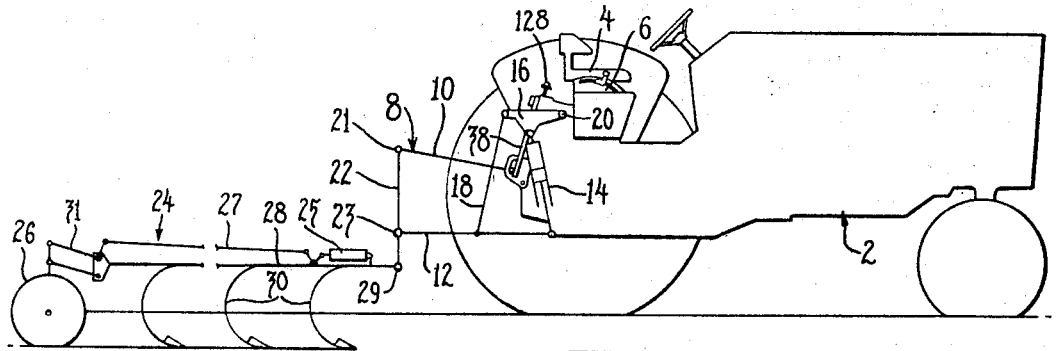
FIG. 1 is a schematic side elevation of a tractor, and semi-mounted earth working implement embodying the control system of the present invention with one of the tractor rear wheels removed for clarity.

In FIG. 1, reference numeral 2 designates a tractor having the seat 4, a control console 6 and a three-point hitch linkage designated generally by reference numeral 8. The tractor hitch 8 includes an upper, control link 10 and a pair of lower draft links 12. Links 10 and 12 each are pivotally connected at their forward ends to the tractor body.

Draft links 12 are actuated vertically with respect to the tractor body by hydraulic actuators 14 pivotally mounted between the tractor body and lift arms 16 mounted on a rock shaft 20 journalled in the tractor body, and connected through drop links 18 with draft links 12. The trailing ends of links 10 and 12 are pivotally connected at 21 and 23, respectively, with a mast or A-frame 22 such that control link 10 follows the pivotal movement of draft links 12.

Secured to the tractor hitch is a semi-mounted implement 24 having a ground engaging wheel 26 for supporting the rear end of the implement. Implement 24 includes a longitudinal frame member 28 pivotally connected at its forward end with A-frame 22 at 29 beneath the pivot point 23 of draft links 12. Wheel 26 is supported on parallel links 31 and is raised and lowered relative to frame 28 by a ram cylinder 25 connected with links 31 through a linkage 27. Cylinder 25 is operated independently of lift arms 16 through the tractor hydraulic system and extends and retracts to respectively lower and raise wheel 26 relative to the implement between transport and working positions. Supported along the length of implement 24 is a plurality of earth working tools or plows 30. The draft forces generated by plows 30 tend to cause A-frame 22 to rotate in a clockwise direction about pivot point 23 and apply a compression force to control link 10.

Figure 2:
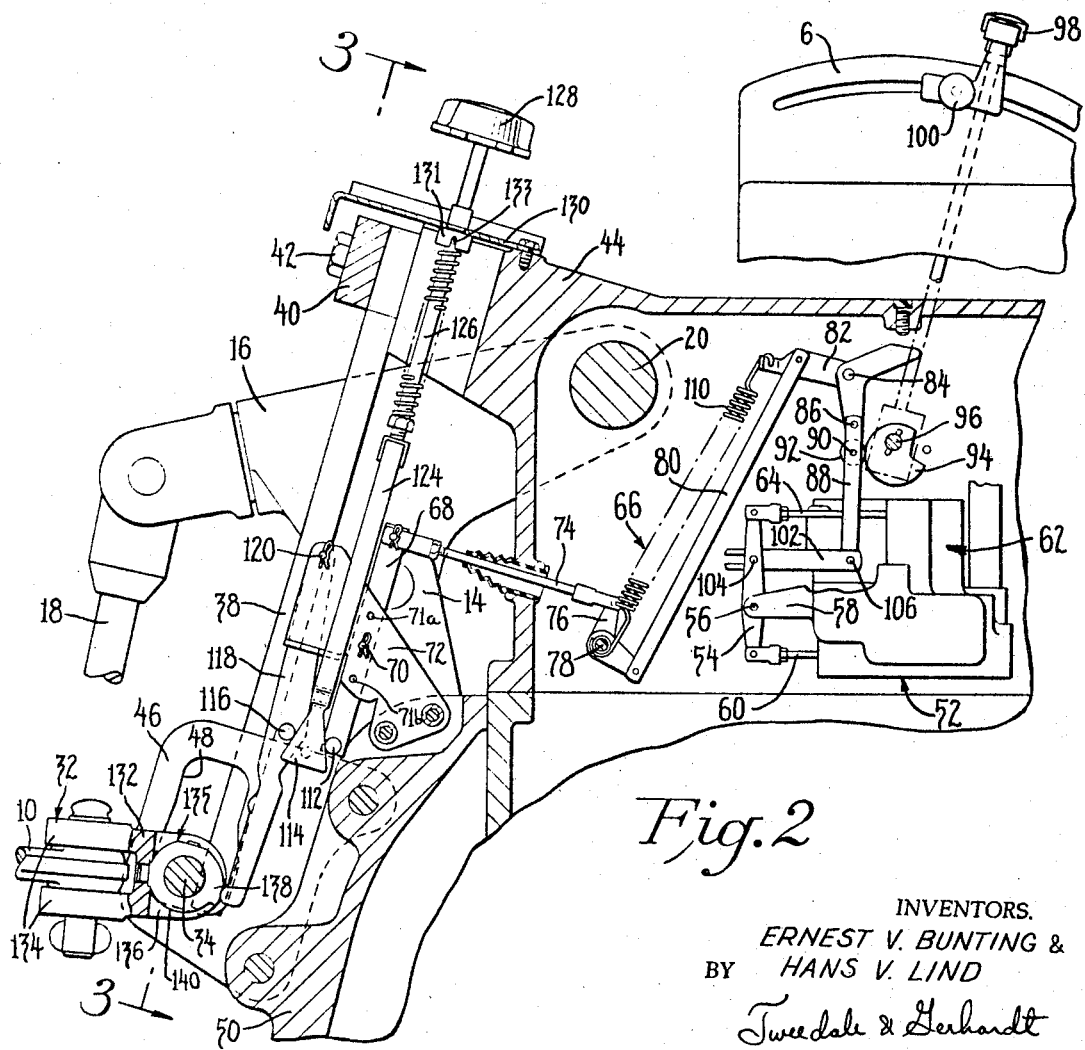
FIG. 2 is an enlarged fragmentary sectional view taken through the rear portion of the tractor.
Figure 3:
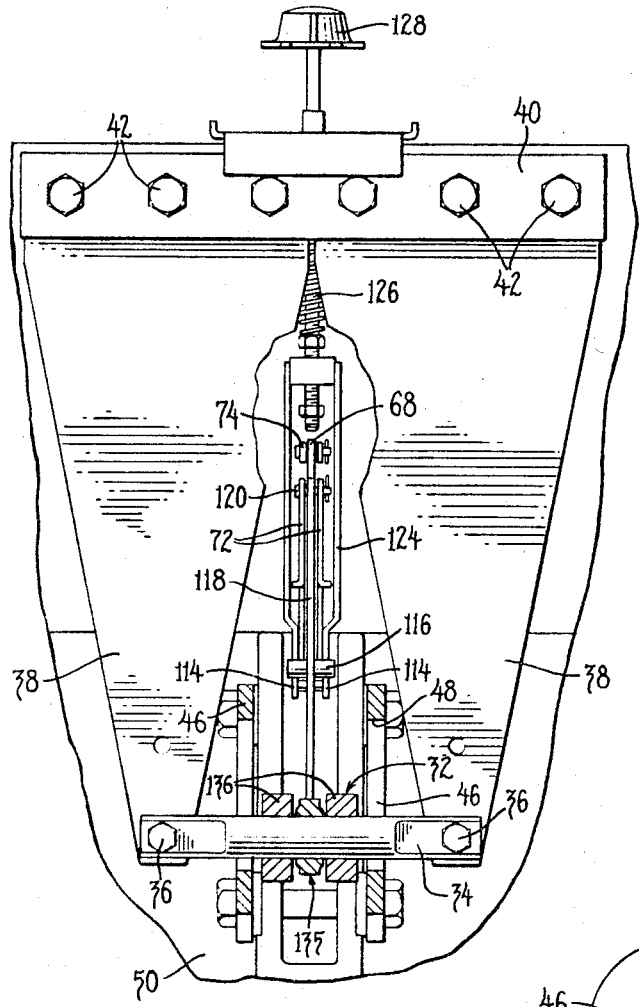
FIG. 3 is an enlarged fragmentary sectional view taken along line 3—3 of FIG. 2.
Figure 4:
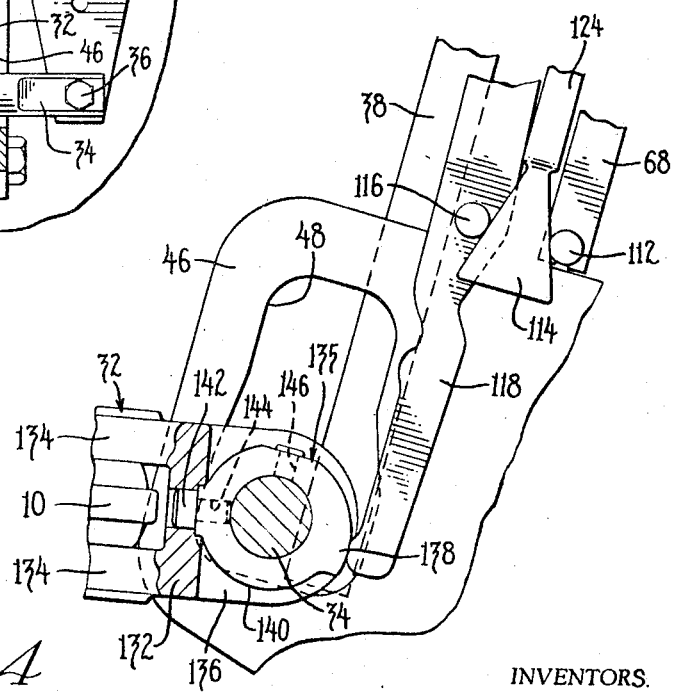
FIG. 4 is an enlarged detailed view of the position compensating cam.

In FIGS. 2, 3 and 4, the forward end of control link 10 is pivotally connected to a clevis 32 rotatably mounted on a transverse bar or rod 34 secured by bolts 36 to the lower ends of a pair of cantilevered draft springs 38 mounted on the rear of a housing 44 formed in the tractor body by a plate 40 and bolts 42. Bar 34 extends through enlarged openings 48 in a pair of guard plates 46 bolted to the rear portion 50 of the tractor body. Openings 48 permit limited longitudinal movement of control link 10 and the lower ends of leaf springs 38 in a direction parallel to the direction of draft. Consequently, if the load applied to control link 10 decreases, spring 38 will move link 10 to the left until the spring force is reduced by the deflection change. Conversely, an increase in the force will result in movement of link 10 to the right.

The flow of hydraulic fluid to and from actuators 14 is controlled by a main control valve 52 enclosed within housing 44 and the tractor body. Hydraulic fluid under pressure is supplied to the main control valve 52 by a pump (not shown). Control valve 52 is preferably of the type having supply, neutral and discharge positions. In the supply position, hydraulic fluid is pumped to actuators 14 causing the actuators to extend and raise the draft links 12, while in the discharge position of valve 52, actuators 14 retract to lower the draft links. When valve 52 is in its neutral position, flow from the pump is blocked, and since the pump is pressure modulated, no pumping occurs and the actuators remain stationary. Preferably, valve 52 is biased toward its supply or draft link raising position.

Valve 52 is actuated between its supply, neutral and discharge positions by a control lever 54 fulcrumed by a pivot pin 56 on a bracket arm 58 extending from the main body of valve 52. Control lever 54 has its lower end connected with the operating member 60 for valve 52. In the illustrated embodiment, movement of operating member 60 toward the right, upon counterclockwise rotation of lever 54 about pin 56, shifts valve 52 toward its discharge position to retract actuators 14. Conversely, clockwise rotation of control lever 54 shifts operating member 60 to the left in FIG. 2 which causes the valve to move toward its supply position and extend actuators 14 and raise the hitch linkage. Control lever 54 is pivotally connected at its upper end with an operating rod 64 of a pressure control device indicated generally at 62, the details and operation of which are fully disclosed in the copending U.S. patent application of E. V. Bunting, H. V. Lind, E. J. Skiba and G. T. Olson, Ser. No. 360,663, filed Apr. 17, 1964, and the corresponding Canadian patent application Ser. No. 928,355, filed Apr. 15, 1965.

The main control valve 52 is operated by a draft control linkage system indicated generally at 66 which transmits a signal to valve 52 in accordance with the deflection of draft springs 38 caused by draft load variations. Linkage system 66 includes a lever 68 fulcrumed between a pair of plates 72 on a pin 70. The upper end of lever 68 is pivotally connected with one end of a link 74, the other end of which is pivotally connected with one arm of a bell crank 76 rotatably mounted on a shaft 78. The other arm of bell crank 76 is connected with one end of a link 80, the other end of which is pivotally connected with one arm of a bell crank 82 rotatably mounted on a shaft 84. The other arm of bell crank 82 is pivotally connected at 86 with one end of a lever 88.

Lever 88 is fulcrumed on a roller 92 connected with lever 88 by a pin 90. Roller 92 engages the surface of a cam 94 eccentrically mounted on a shaft 96. The position of cam 94 relative to the fulcrum of lever 88 is determined by a manual operating lever 98 engaged with control console 6. A locator knob 100 is provided on console 6 so that the operator can quickly return lever 98 to a preselected position.

The lower end of lever 88 is pivotally connected at 106 with a slide 102 having a forked end engaged with a pin 104 mounted in lever 54. Since, as pointed out above, valve 52 is biased toward its supply position, a fluid admitting direction with respect to actuators 14, operating member 60 biases lever 54 in a clockwise direction about pin 56 which in turn biases pin 104 against slide 102.

Secured between bell crank 82 and the shaft 78 of bell crank 76 is a helical spring 110 which resiliently urges bell crank 82 in a counterclockwise direction about shaft 84 and maintains roller 92 in contact with cam 94. Spring 110, acting through link 80, biases bell crank 76 in a clockwise direction about shaft 78 which in turn urges lever 68 in a clockwise direction about pin 70 to maintain a follower 112 on the lower end of lever 68 in engagement with one side of a wedge shaped cam element 114. The other side of the wedge shaped cam 114 is engaged by the follower 116 carried by a sensing lever 118 pivoted at 120 between plates 72. The free end of sensing lever 118 follows the movement of the lower ends of springs 38 as well as control link 10 and clevis 32. Thus, an increase on the draft force acting on tools 30 (FIG. 1) causes spring 38 to deflect to the right as viewed in FIG. 2 and pivot sensing lever 118 in a counterclockwise direction about pin 120.

The wedge-shaped cam elements 114 are formed on the lower ends of a pair of spaced arms 124 of a yoke-like member mounted on a threaded rod 126. Rod 126 is secured at its upper end to a swivel-type fitting 131 mounted on a support plate 130 such that rod 126 is freely pivotal to permit the cam elements 114 to move with sensing lever 118 and lever 68 in response to deflection of the draft springs 38. Mounted in fitting 131 on the opposite side of plate 130 is an operating knob 128. Rotation of knob 128 is transmitted to rod 126 through a pin 133 engaged in a slot formed in fitting 131, which rotation causes arms 124 and cam elements 114 to move upwardly and downwardly on rod 126 as desired.

Counterclockwise rotation of sensing lever 118 acts through follower 116 and cam 114 to rotate lever 68 in a counterclockwise direction about pin 70. Counterclockwise rotation of lever 68 acts through link 74, bell crank 76, link 80 and bell crank 82 to rotate control lever 88 in a counterclockwise direction about roller 92 and shift slide 102 toward the right in FIG. 2 permitting operating member 60 to move toward the left in a direction to extend actuators 14 and raise draft links 12. Conversely, a reduction in the draft forces on the tractor hitch causes link 10 to move toward the left in FIG. 2 resulting in clockwise rotation of sensing lever 118 and lever 68, which motion is reflected by clockwise rotation of lever 88 about pin 90 to shift side 102 toward the left in FIG. 2 to actuate valve 52 in a direction to retract actuators 14 and lower the draft links 12.

For draft control operation, the operator selects the draft force to be maintained on the implement by adjusting lever 98 and the vertical position of cam elements 114 through knob 128. The position of lever 98 determines the operating position of the fulcrum 90 of lever 88. As cam 94 is rotated in a clockwise direction by lever 98, lever 88 pivots in a clockwise direction about pin 86 thus shifting its fulcrum 90 as well as slide 102 toward the left in FIG. 2. Leftward movement of slide 102 acts through member 60 to move valve 52 toward its discharge position, or in a draft link lowering direction. Consequently, the draft force required to hold valve 52 in its neutral position increases with clockwise rotation of cam 94, and decreases with counterclockwise rotation of cam 94.

To start into operation with a semi-mounted implement of the type schematically illustrated in FIG. 1, the operator sets lever 98 to determine the draft or working force to be maintained by the implement and draft links 12 will move downwardly until the selected draft force is developed by the tools 30 carried by implement 24. Tools 30 will dig into the earth until the draft force called for is attained, at which point, the control valve will return to its neutral position and hold the draft links in a fixed position until the draft force changes. Thus, since the draft force increases and decreases with increases and decreases in the working depth of tools 30, the tools will seek a depth that will develop the draft force necessary to restore valve 52 to its neutral position.

However, the tools 30 nearest pivot point 29 will move vertically, in response to vertical movement of draft links 12, at a faster rate than the tools 30 at the opposite, rear end of the implement since frame 28 will pivot about the ground wheel 26 which may be in its transport position, when the links are raised or lowered. Thus, at the beginning of the operation, the forward tools 30 will move into the earth before the rear tools. The rear tools, being supported above the ground by wheel 26 or at a shallower depth than the forward tools, will not develop their proportionate share of the draft force, and in order to attempt to bring the hydraulic system into balance, the forward tools will reach an excessive depth and will frequently cause the tractor to stall. The same problem arises when the forward or leading tools encounter low density soil, which will reduce the draft force and cause a lower signal to be transmitted to the control valve and again cause the forward tools to "dive" or dig into an excessive depth. Conversely, if high density soil is encountered causing a "raise" signal to be transmitted to the control valve, the forward tools will tend to move to a more shallow depth than called for by the draft spring deflection.

In order to prevent the above situation from occurring, a position compensating cam 135 is mounted on rod 34 in the path of sensing lever 118.

With reference to FIG. 4, clevis 32 includes a base portion 132 and a pair of rearwardly projecting ears 134 between which the forward end of link 10 is pivotally connected. Projecting forwardly from base member 132 is a pair of spaced, apertured ears 136 through which rod 34 extends. The position compensating cam 135 includes a noncircular, cam surface 138 and a constant radius surface 140. Mounted in base member 132 is a fastener 142 having a threaded shank which extends forwardly from base member 132 in alignment with control link 10. Formed in the constant radius portion of cam 135 is a threaded opening 144 for receiving the shank of fastener 142. In this position, the sensing lever 118 engages the noncircular cam surface 138 of cam 135. Clockwise rotation of cam 135 about rod 34 as viewed in FIG. 4, causes lever 118 to rotate in a counterclockwise direction about its pivot point 120, that is the lower, free end of sensing lever 118 moves toward shaft 34. Conversely, the configuration of portion 138 of cam 135 is such that counterclockwise rotation of cam 135 caused by downward pivotal movement of control link 10 causes the lower, free end of sensing lever 118 to move away from rod 34 or toward the right as viewed in FIG. 4. Thus, when the draft force increases to cause link 10 to shift toward the right in FIGS. 2 and 4, valve 52 causes actuators 14 to raise the draft links 12 due to the counterclockwise movement of sensing lever 118. However, as the links are raised by the actuators, the resulting clockwise movement of cam 135 adjusts sensing lever 118 in a clockwise direction about fulcrum 120 to cancel a portion of the initial draft signal and reduce the effect on the draft signal on valve 52 and cause a quicker return of the system to neutral. As a result, the draft correction of the front end of the implement is reduced to acceptable limits. In addition to the draft signal caused by deflection of spring 38, there is a position signal caused by the follow-up movement of cam 135.

In cases where the tractor is used with a fully mounted implement where there is no need for the position compensating signal, cam 135 can be removed from fastener 142 and rotated approximately ninety degrees. This places a threaded opening 146 in alignment wth fastener 142 and the constant radius portion 140 of cam 135 is engaged by sensing lever 118. Since there is no change in the radius engaged by sensing lever 118, no signal is transmitted to the main control valve 52 by pivotal movement of the top link 10.

The sensitivity of the draft control linkage can be varied by moving pivot pin 70 of lever 68 to holes 71a or 71b (FIG. 2) in plates 72 to change the mechanical advantage of lever 68. With lever 68 pivoting about holes 71a, the longer lever arm between holes 71a and follower 112 results in less movement of slide 102 per increment of deflcetion of spring 38. Conversely, with lever 68 pivoting about hole 71b, the shorter lever arm between the lever fulcrum at holes 71b causes increase response of slide 102 per increment of spring deflection to increase the sensitivity of the linkage to draft load changes.

Figures 5, 6, 7:
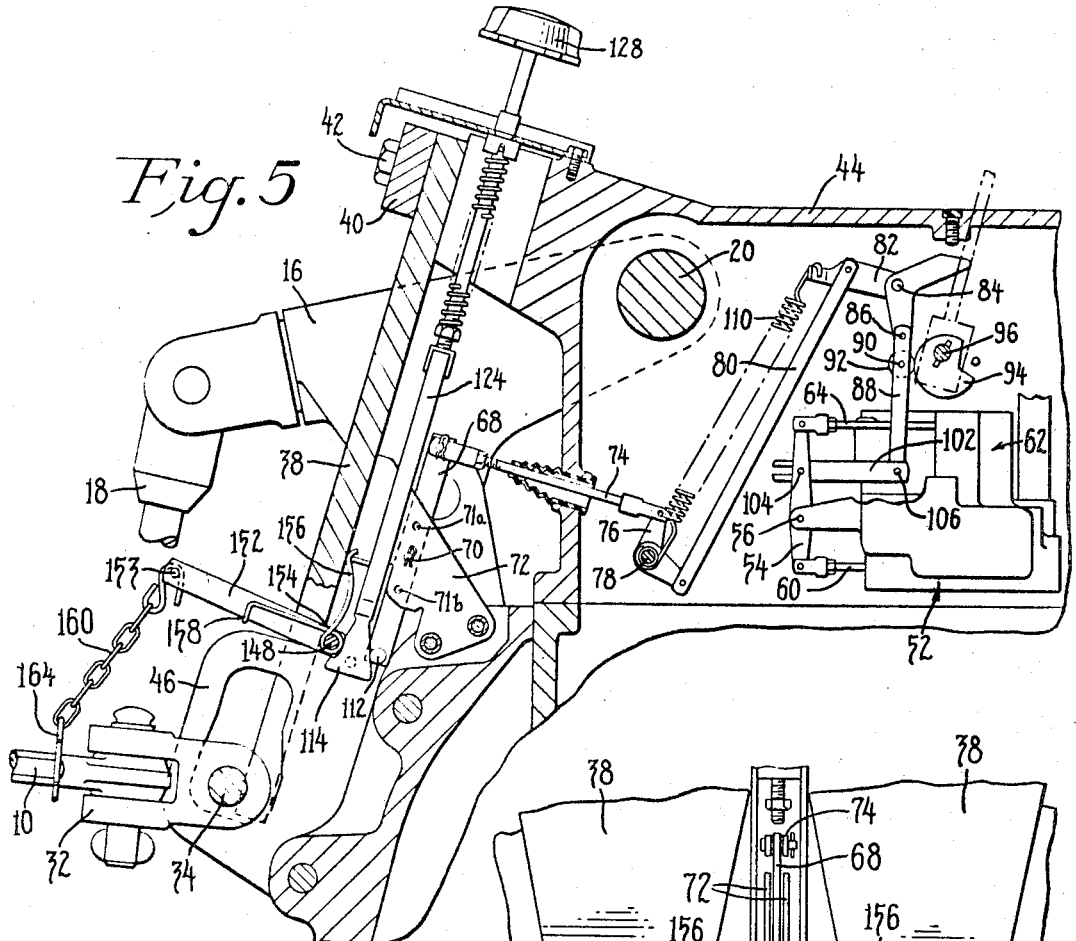
FIG. 5 is a view similar to FIG. 2 illustrating a second embodiment of the invention.
FIG. 6 is a view similar to FIG. 3 of the embodiment illustrated in FIG. 5.
FIG. 7 is an enlarged fragmentary view of the position compensating mechanism of the embodiment of FIG. 5.

In embodiment of FIGS. 5–7, a shaft 148 is rotatably mounted in blocks 149 secured to draft springs 38 (FIG. 6). A cam 150 is formed on the central portion of shaft 148 and engages the wedge-shaped cam element 114 on the opposite side of the follower 112 carried by lever 68. Sensing lever 118 of the previous embodiment is omitted and the draft spring deflection is sensed by the engagement of cam elements 114 with shaft 148.

Fixed to shaft 148 and projecting radially therefrom on opposite sides of cam 150, is a pair of lever arms 152 connected at their free ends by a pin 153. Mounted on shaft 148 on opposite sides of cam 150 is a pair of torsion springs 154 each having an arm 156 engaging the adjacent draft spring 38 on its forward side and a leg 158 hooked onto the lower side of the adjacent lever arm 152 at point spaced from shaft 148.

Springs 154 bias lever 152, and consequently cam 150, in a clockwise direction as viewed in FIGS. 5 and 7.

Lever 152 is held in the position shown in FIGS. 5 and 7 against the bias of springs 154 by a chain 160 hooked at one end to pin 153 and secured at its other end to a hook 164 mounted on control link 10. As a result, lever 152 as well as cam 150 follow the pivotal movement of control link 10 about the axis of rod 34 and rotate accordingly about the axis of shaft 148. The configuration of cam 150 is such that, when lever 152 is connected with control link 10, counterclockwise rotation of cam 150 resulting from downward pivotal movement of control link 10 causes the wedge-shaped cam 114 and follower 112 to shift relative to shaft 148 toward the right in FIGS. 5 and 7 to transmit a "raise" signal to valve 52. Conversely, clockwise rotation of cam 150 resulting from upward pivotal movement of control link 10 causes lever 68 to shift toward the left and transmit a "lower" signal to valve 52. That is to say, the original draft signal to valve 52 is reduced proportionately by the amount of follow-up rotation of cam 150.

When the flexible chain 160 is unhooked from lever 152, the cam 150 is released from control link 10 and springs 154 causes the lever 152 to swing upwardly (clockwise in FIG. 5) to an inactive position. With cam 150 deactivated by its disconnection from control link 10, the wedge-shaped cam 114 and lever 68 respond only to draft force variations. Thus, by merely connecting lever 152 with control link 10 through chain 160, the controls are converted from a pure draft control system to a mixed position and draft control system as in the previous embodiment.

In both embodiments, no modification of the internal controls is required. The compensating cam of both embodiments are readily accessible to the operator for selective adjustment between their active and inactive positions.

While specific embodiments of the invention are described and illustrated in the foregoing specification and accompanying drawings, the invention is not limited to the exact construction shown. Modifications and alterations in the construction and arrangement of parts, as well as various equivalents, all falling within the scope and spirit of the invention, will be apparent to those skilled in the art.

We claim:
1. In a tractor having vertically movable draft links, power means for raising and lowering the draft links with respect to the tractor, and draft load sensing means connected with the power means operable to transmit a draft control signal to the power means in response to increases and decreases in the draft load on the draft links to actuate the power means to respectively raise and lower the draft links from a preselected neutral position with respect to the tractor; position compensating means comprising a cam mounted on the tractor for rotation about an axis in response to vertical movement of the draft links with respect to the tractor, said cam being connected to cause said draft load sensing element to move in a draft link lowering direction in response to upward movement of the draft links and in a draft link raising direction in response to downward movement of the draft links, said cam being selectively rotatable about said axis to a deactivated position in which position the draft load sensing element is unaffected by vertical movement of the draft links, and means for restraining said cam against movement from said deactivated position.

2. The construction of claim 1 further including a lever fixed to said cam; means interconnecting said lever with said draft links; means biasing the lever to follow the pivotal movement of said draft links to cause corresponding rotation of said cam, said biasing means causing said cam and lever to rotate to an inactive position when said lever is released by said interconnecting means so as to have no effect on the position of the sensing element.

3. The construction of claim 1 further including a control link mounted on the tractor for pivotal movement in response to vertical movement of the draft links as well as for longitudinal movement in the direction of draft in response to changes in draft load, and wherein said cam is mounted on the pivotal axis of said control link for rotation therewith, and wherein said sensing element is biased into engagement with said cam.

4. The construction of claim 3 wherein said cam includes a constant radius portion normally displaced from said sensing element, said cam being selectively rotatable about said pivotal axis relative to the control link to an inactive position in which the sensing element engages said constant radius portion and is unaffected by vertical movement of the draft links.

5. A tractor including a main body, a three point hitch mounted on said main body including draft links pivotally connected with the rear of said main body and a control link mounted on the rear of said main body for pivotal as well as limited longitudinal movement in the direction of draft, means interconnecting the control link with the draft links for causing the control link to move toward and away from the tractor body in response to increases and decreases, respectively, in the draft force on the draft links, and to follow the pivotal movement of the draft links with respect to the tractor body, a control valve connected with a source of hydraulic pressure, said control valve having supply, neutral and discharge positions, a hydraulic actuator communicating with said valve operable to extend in response to actuation of the valve to its supply position and to retract in response to actuation of the valve to its discharge position, means connecting the hydraulic actuator with said draft links for raising and lowering the draft links upon extension and retraction, respectively, of the hydraulic actuator, draft control means connected with said valve including a draft load sensing element mounted on the main body for movement with respect to said body in opposite directions to move the valve toward its supply or discharge position, means biasing the sensing element to follow said longitudinal movement of said control link and move the valve toward its supply or discharge position in response to increases and decreases in the draft force, position compensating means connected between the control link and sensing means operable in response to upward and downward pivotal movement of the control link to move the sensing element in a draft link lowering and raising directions, respectively, said position compensating means comprising a cam engaging said draft load sensing element and rotatable about a horizontal axis transverse to the direction of draft in response to pivotal movement of said control link, said cam having a configuration to cause the sensing element to transmit a compensated draft link raising movement to the control valve in response to downward pivotal movement of the control link and a compensated draft link raising movement to the control valve in response to upward pivotal movement of the control link, said compensated movements increasing with the pivotal movement of the control link, a lever fixed to said cam, means connecting said lever with said control link, means biasing the lever to follow the pivotal movement of the control link to cause corresponding rotation of said cam, said biasing means causing said cam and lever to rotate to an inactive position when said lever is released by said connecting means such that the sensing element responds to draft load variations only.

6. The construction of claim 5 wherein said cam includes a constant radius portion normally displaced from said sensing element, said cam being selectively rotatable about said pivotal axis relative to the control link to an inactive position in which the sensing element engages said constant radius portion and is unaffected by pivotal movement of the control link.

7. A tractor as defined in claim 5 further including draft spring means mounted on the rear of the tractor body, a rod carried by said spring means and extending transversely to the direction of draft, and wherein said control link is pivotally mounted on said rod.

8. A tractor as defined in claim 7 wherein said position compensating means comprises a cam rotatably mounted on said rod and connected with said control link for rotation therewith about the axis of said rod, said draft load sensing means being biased into engagement with said cam, said cam having a configuration to cause the sensing element to transmit draft link lowering and raising signals to the control valve in response to upward and downward movement, respectively, of the control link.

9. A tractor as defined in claim 8 wherein said cam includes a constant radius portion with respect to the axis of said rod which is normally displaced from the sensing element, and wherein said cam is selectively rotatable about the axis of said rod relative to the control link to an inactive position in which the sensing element engages said constant radius portion and is thereby uneffected by pivotal movement of the control link.

10. A tractor as defined in claim 7 wherein said draft spring means comprises a pair of cantilevered leaf springs depending from the rear of the tractor body on each side of the sensing element and said rod is mounted on the lower free portions of said springs.

References Cited by the Applicant

UNITED STATES PATENTS

| 2,921,638 | 1/1960 | Du Shane | 172—9 |
| 3,198,261 | 8/1965 | Clarke | 172—9 |
| 3,246,702 | 4/1966 | Carlin | 172—10 |

ABRAHAM G. STONE, *Primary Examiner.*
JIMMIE R. OAKS, *Assistant Examiner.*